March 14, 1939.  W. E. FISHER  2,150,678
CONDENSER
Filed Sept. 9, 1936
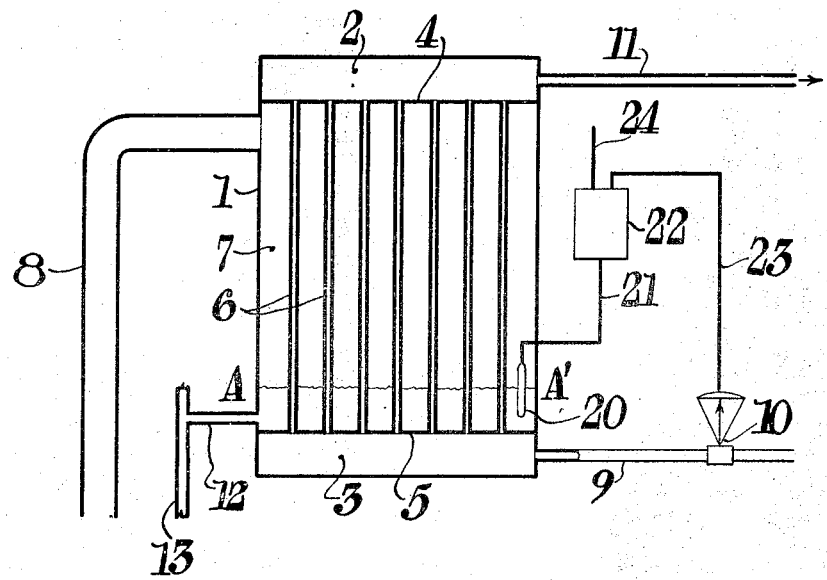
Webster E. Fisher,
INVENTOR:
N. M. Perrins
Daniel J. Mayne
BY
ATTORNEYS.

Patented Mar. 14, 1939

2,150,678

UNITED STATES PATENT OFFICE 2,150,678

CONDENSER

Webster E. Fisher, Rochester, N. Y., assignor to Eastman Kodak Company, Rochester, N. Y., a corporation of New Jersey Application September 9, 1936, Serial No. 99,987

2 Claims. (Cl. 257—2)

This invention relates to the art of distillation and particularly to improvements in apparatus for condenser regulation.

In distillation plants it is important to use the least amount of water supplied to the condenser and the control of this condensing water has always presented a problem. Changes in rate of distillation and changes in temperature of the vapors as a result of the gradual increase in boiling points of the materials vaporized require changes in temperature control of the condenser. In some cases the condenser temperature is controlled by regulating the water flow by using a manually operated valve. Under these conditions the amount of water used must always be in excess of that required since it is necessary to have a certain factor of safety in case of change in temperature of the still, distillation rate, etc. Furthermore, it is necessary for the still operator to shut the water off every time the still is shut down and to turn it on every time it is started. After starting the still, it requires considerable time to find the setting of the water valve for the best operation. For all these reasons, the amount of water used is more than necessary.

In other cases, an automatic control for the water supply has been used. This has taken the form of a thermal element inserted with its axis at right angles to the line of passage of vapors through the condenser or is parallel with the vapor line. Such disposure of the controlling element is conventional and is disclosed in U. S. Patent No. 1,674,852. As a result of such disposition the controller, no matter what its sensitivity may be, acts as an on and off type of control. As soon as the hot vapor strikes the controlling thermal element it almost immediately assumes the temperature of the hot vapor, this causes the water supply to the condenser to be opened to its greatest extent and the condenser is greatly overcooled causing the vapors to condense before reaching the controlling element. The element then becomes cold and the water is shut off entirely. The result of this system is therefore that the water supply valve is either fully opened or fully closed. The most serious disadvantage of this mode of operation is that when the water valve opens the rate of condensation increases immediately, causing a partial vacuum in the condenser which momentarily increases the rate of distillation. When the water shuts off the rate of condensation decreases and the distillation rate decreases. This makes for very unsteady operating conditions, and is highly undesirable from the point of view of good operation. In cases where a still is being operated at a point near its full capacity these condenser surges may result in entrainment.

This invention has for its object to overcome the above deficiencies of heretofore known means for the regulation of surface condensers. Another object is to provide improved automatic means for regulation of water supply to a surface condenser. A further object is to provide an improved automatically regulated surface condenser. Other objects will appear hereinafter.

These objects are accomplished in accordance with the herein described invention which comprises disposing a thermal expansion element in the surface condenser so that its longitudinal axis is substantially parallel to the line of flow of vapors therethrough or in other words approximately at right angles to the vapor line and directly or indirectly actuating a valve controlling the water supply to the condenser by the expansion or contraction of the thermal element.

In the following examples and description I have set forth several of the preferred embodiments of my invention, but it is to be understood that they are given for the purpose of illustration and not as a limitation thereof.

In the drawing is illustrated diagrammatically and partly in section a surface condenser provided with an automatic control device embodying the principles of my invention.

Referring to the drawing, refernce numeral 1 designates a conventional surface condenser separated into compartments 2 and 3 by partitions 4 and 5 respectively. Compartments 2 and 3 are connectd by a plurality of cooling pipes 6. The section 7 formed between plates 4 and 5 communicates with vapor conduit 8 which connects with the still or vapor generating means (not shown). Section 3 is provided with a water inlet pipe 9 which is provided with a diaphragm valve 10. Section 2 is provided with a water exit conduit 11. The lower portion of section 7 connects to conduits 12 and 13 through which condensate is removed. Reference numeral 20 designates a thermal expansion element which in the drawing is shown in the form of a mercury filled bulb communicating with a conduit which is connected to a control device 22. Pressure from the bulb 20 causes actuation of control valve 10 by varying the air pressure in line 23. Compressd air serving as the valve actuating medium is supplied to the controller 22 through line 24.

The controller 22 and valve 10 are conventional apparatus and their mode of operation will be readily understood by those familiar with this art. The controller may or may not be of the resetting type. One type of controller suitable for this purpose is described in Catalog #56-R, November 1934 of the Taylor Instrument Company. This may or may not be used in conjunction with the Taylor double response unit described in Catalog #37-R, 1935. Another type of controller suitable for this purpose is the Foxboro Stabilog, described in Bulletin #175, 1936, of the Foxboro Co. Other suitable controllers could of course be used. The line A—A designates the vapor line, that is, the point at which the vapors are sufficiently cooled to cause them to condense. This line shifts upwards or downwards, depending upon the amount of water supplied to the condenser.

In operation, the control apparatus is so adjusted that when the bulb is completely immersed in hot vapor, the control valve 10 is open to allow the maximum amount of water that will be required, and when the vapor is above the bulb the water will be completely shut off. When so adjusted the line of vapor A—A cuts the bulb at right angles. If the condenser is not receiving enough water, the line of vapor will travel downwards toward the bottom of the condenser. This will increase the temperature of the bulb and will cause a slight increase in the amount of water supplied through valve 10. Conversely, if there is too much water supplied to the condenser the line of vapor will travel upwards and will lower the temperature of the bulb, since a greater portion of it will be at cold condensate temperature, thereby decreasing the water supplied to the condenser.

It is found in practical operation that the line of vapor will reach a certain equilibrium point and will remain there, the control valve floating in a given position. If conditions in the still change the line of vapor will change and will increase or decrease the amount of water supplied as may be required. Changes in distillation rate and temperature of vapors will cause the vapor line to travel up or down the length of the bulb but will seldom leave it. It should be noted that the top of the control bulb is at the temperature of the condensing vapor, while the bottom is essentially at cold condensate temperature, hence the actual temperature as indicated or recorded on the controller is simply an average temperature.

In many cases it has been customary to employ a surface condenser provided with internal baffles. In such a case the direction of flow of the vapors between the baffles will be substantially changed, but it will be found that the line of vapor will form at substantially right angles to the general direction of the vapors through the still, that is the direction from the vapor inlet to the condensate outlet of the condenser. The direction of flow of the vapors at or near the vapor line will also be substantially parallel to the general direction of the vapors, or at right angles to the vapor line. For these reasons the expression "parallel to the line of flow of the vapors" is to be understood as being applied to the direction of the vapors at, or near the vapor line when baffles are employed.

It is apparent that many changes can be made in the above described apparatus without departing from the spirit or scope of my invention. For instance the principles of my invention can be employed with any other type of surface condenser than that illustrated. While the valve is shown as being indirectly actuated by compressed air it is apparent that this can be accomplished by other equivalent methods such as electrical actuation, or the expansion of the thermal element can be made to directly actuate the cooling fluid valve which also may be of any other convenient type than that illustrated. Many other obvious variations will be apparent to those skilled in this art.

While I have specifically illustrated a thermal expansion element taking the form of a mercury filled bulb, all other elements of this type which operate upon the principle of thermal expansion can be employed. For instance other fluids whether all liquid or all gas can be used as a filling for the bulbs or a mechanical expansion element formed of strips of metal having different coefficients of expansion can be employed. A bulb which operates upon the principle of vapor pressure of a liquid is not suitable since the temperature or pressure indicated by such a bulb is a function of the highest temperature to which any portion of the bulb is subjected.

My invention enables the smooth and accurate automatic control of condensation to a degree heretofore unattainable either with manual or prior known automatic methods. A particular advantage is that the flow of cooling fluid is smooth and changes are gradual corresponding with those in the still, so that unsteady control resulting in entrainment, and waste is avoided.

What I claim is:

1. In combination, a surface condenser and means for supplying cooling fluid thereto, a thermal expansion element located so that its longitudinal axis is cut at approximately right angles by the vapor line formed by condensing vapors, and means directly or indirectly operated by the expansion or contraction of the element, for controlling the rate of admission of cooling fluid to the condenser.

2. In combination, a surface condenser and means for supplying cooling fluid thereto, a thermal expansion bulb located in the condenser so that its longitudinal axis is substantially parallel to the path which vapors to be condensed would take through the condenser and approximately at right angles to the vapor line and means, directly or indirectly operated by the expansion or contraction of the element, for controlling the rate of admission of cooling fluid to the condenser.

WEBSTER E. FISHER.